United States Patent [19]

McCartney

[11] Patent Number: 4,496,624

[45] Date of Patent: Jan. 29, 1985

[54] FIBROUS WEB IMPREGNATED WITH COAGULATED POLYURETHANE AND POLYOLEFIN ADMIXTURE

[75] Inventor: John R. McCartney, Westtown, Pa.

[73] Assignee: Norwood Industries, Inc., Malvern, Pa.

[21] Appl. No.: 569,754

[22] Filed: Jan. 10, 1984

Related U.S. Application Data

[63] Continuation-in-part of Ser. No. 398,260, Jul. 14, 1982, abandoned, which is a continuation-in-part of Ser. No. 188,329, Sep. 18, 1980, Pat. No. 4,376,148, and Ser. No. 188,330, Sep. 18, 1980, Pat. No. 4,342,805.

[51] Int. Cl.³ .............................................. B32B 5/06
[52] U.S. Cl. ................................... 428/288; 428/151; 428/290; 428/904
[58] Field of Search ................ 428/151, 288, 290, 904

[56] References Cited

U.S. PATENT DOCUMENTS

| | | | |
|---|---|---|---|
| 3,100,721 | 8/1963 | Holden | 117/135.5 |
| 3,208,875 | 9/1965 | Holden | 117/135.5 |
| 3,412,054 | 11/1968 | Milligan et al. | 260/18 |
| 3,708,333 | 1/1973 | Carlson | 117/140 A |
| 3,860,472 | 1/1975 | Derville | 156/148 |
| 3,936,555 | 2/1976 | Smith | 428/151 |
| 3,940,532 | 2/1976 | Smith | 428/218 |
| 4,046,729 | 9/1977 | Scriven et al. | 260/29.2 TN |
| 4,094,847 | 6/1978 | Huffman et al. | 260/29.4 R |
| 4,137,209 | 1/1979 | Wong et al. | 260/29.6 NR |
| 4,171,391 | 10/1979 | Parker | 427/246 |
| 4,332,710 | 6/1982 | McCartney | 524/591 |

FOREIGN PATENT DOCUMENTS

| | | |
|---|---|---|
| 54-21401 | 7/1979 | Japan . |
| 1426087 | 2/1976 | United Kingdom . |
| 1441439 | 6/1976 | United Kingdom . |
| 1465415 | 2/1977 | United Kingdom . |
| 2039926 | 8/1980 | United Kingdom . |

*Primary Examiner*—Marion E. McCamish
*Attorney, Agent, or Firm*—Webb, Burden, Robinson & Webb

[57] ABSTRACT

A stable aqueous polymeric composition is comprised of an aqueous anionic polyurethane dispersion and a compatible polymeric dispersion or emulsion. The compatible dispersions or emulsions may have a substantially neutral pH or be anionic or cationic. The polymeric compositions are useful in impregnating porous substrates to form composite sheet materials which can be further processed to form simulated leather and the like.

24 Claims, No Drawings

FIBROUS WEB IMPREGNATED WITH COAGULATED POLYURETHANE AND POLYOLEFIN ADMIXTURE

CROSS-REFERENCE TO RELATED APPLICATIONS

This application is a continuation-in-part of U.S. patent application Ser. No. 398,260, filed July 14, 1982 now abandoned, which is a continuation-in-part of U.S. patent application Ser. No. 188,329, filed Sept. 18, 1980, now U.S. Pat. No. 4,376,148, and U.S. patent application Ser. No. 188,330, filed Sept. 18, 1980, now U.S. Pat. No. 4,342,805.

BACKGROUND OF THE INVENTION

1. Field of the Invention

This invention relates to resin impregnated porous sheet materials, and more particularly, to resin impregnated fibrous webs having a uniform density throughout which can be further processed into simulated leather-like sheet materials.

2. Description of the Prior Art

Resin impregnated porous sheet materials such as cloth, batts, waterleaves and the like are well known in the art. These resin impregnated sheet materials are useful for a plurality of purposes, including imitation leather in the form of vinyls and the like, structural sheet materials such as conveyor belts, and similar products.

Prior art methods of impregnating a particular web involve the impregnation or coating of a porous material with a polymeric resin such as a polyurethane, vinyl or a similar material. Polyurethanes have met with wide acceptance as a coating or impregnating composition due to their capability of wide variation in chemical and physical properties, particularly their flexibility and chemical resistance. In impregnating the porous sheet material with a polymeric resin, several techniques have been employed. One such prior art method involves the use of the polymeric resin in an organic solvent system wherein the sheet material is dipped in the solution and the solvent is removed therefrom. These solvent systems are undesirable since the solvent, in many cases, is toxic and must either be recovered for reuse or discarded. These solvent systems are expensive and do not necessarily provide a desirable product since upon evaporation of the solvent from the impregnated porous sheet material, the resin tends to migrate to provide a non-homogeneous impregnation of the porous sheet material, resulting in resin richness toward the surface of the sheet material rather than uniform impregnation. In order to alleviate the problems with solvent systems, certain aqueous polymeric systems have been proposed. In forming impregnated sheet materials by impregnation with aqueous polymers, the aqueous portion must be removed. Again, heat is required and migration of the polymer to the surfaces of the impregnated sheet material is encountered.

In one method of combining polyurethane solutions with porous substrates, the polymer is applied in an organic solvent to a substrate, such as a needle punched polyester batt. The polymer-substrate composite is subsequently bathed with a mixture of organic solvent for the polymer and a non-solvent for the polymer that is at least partially miscible with the solvent until the layer is coagulated into a cellular structure of interconnected micropores. The solvent is removed from the coating layer along with the non-solvent to produce a solvent-free microporous layer. Although this process yields acceptable properties for a polyurethane impregnated fabric, it has the disadvantage of an organic solvent system, particularly when high performance polyurethanes are utilized which require relatively toxic and high boiling solvents. An example of this method is disclosed in U.S. Pat. No. 3,208,875.

In another method, polyurethane dispersions in organic vehicles have been proposed and used to coat porous substrates such as is disclosed in U.S. Pat. No. 3,100,721. In this system, a dispersion is applied to a substrate, and coagulated by further addition of a non-solvent. Although this approach has been used with some success, it involves two major limitations: (1) the vehicle of the dispersion is substantially organic since relatively small amounts of non-solvent, preferably water, are needed to form a dispersion; and (2) there is a narrow useful range of added non-solvent so that reproducible results are difficult to obtain.

One particularly useful method of preparing composite sheet material by impregnating a porous substrate is disclosed in U.S. Pat. No. 4,171,391, incorporated herein by reference. In this system, a porous sheet material is impregnated with an aqueous ionic dispersion of a polyurethane and the impregnant is coagulated therein.

Another method of forming impregnated porous substrates, and particularly non-woven sheet materials, is described in U.S. Pat. No. 4,376,148 by John McCartney entitled "Impregnated Non-Woven Sheet Material With Ionically Solubilized Resin," incorporated herein by reference. In that patent, needled fibrous batts are impregnated by fully saturating the batt with an aqueous dispersion or emulsion of a polymeric resin. The fully saturated needled batt is contacted with a coagulating agent to coagulate the polymeric resin from the aqueous dispersion and deposit the polymeric resin within the needled batt. The batt is dried to form an impregnated fibrous web having polymeric resin distributed throughout the batt with a density of the web being uniform throughout, and the bulk density of the web being less than the actual density of the web. The impregnated web is characterized by having filaments which are both coated and uncoated with polymeric resin and concentrations of polymeric resin.

A particular utility for the sheet material disclosed in U.S. Pat. No. 4,376,148 is the formation of leather-like materials therefrom. Such processes and compositions are more fully disclosed in U.S. Pat. No. 4,342,805 by John McCartney entitled "Simulated Leather Sheet Material," incorporated herein by reference. In the process of that patent, the impregnated fibrous mass is heated under heat and pressure with the heat and pressure being applied to at least one surface thereof to develop a grain layer on one surface and a split layer on the opposing surface, thus forming the leather-like sheet material. In both of the cited patents, along with U.S. Pat. No. 4,171,391, the preferred polymers are polyurethanes due to their high performance physical and chemical properties. The present invention is an improvement over these impregnation methods in that it utilizes additional polymers as impregnation compositions. These additional polymers provide enhanced properties and also allow for variations in properties for particular end uses.

BRIEF DESCRIPTION OF THE INVENTION

A stable aqueous polymeric composition is comprised of an aqueous anionic polyurethane dispersion and a compatible polymeric dispersion or emulsion. The compatible dispersions or emulsions may have a substantially neutral pH or be anionic or cationic. The polymeric compositions are useful in impregnating porous substrates to form composite sheet materials which can be further processed to form simulated leather and the like.

DETAILED DESCRIPTION OF THE INVENTION

The aqueous ionic polyurethane dispersion constituent of the impregnation composition is anionic, and preferably has carboxylic acid groups covalently bonded to the polymer backbone.

Neutralization of these carboxyl groups with an amine, preferbly a water soluble monoamine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hindrance of the carboxyl by the adjacent alkyl groups. This approach provides the desired carboxyl-containing polymer with the carboxylic groups being neutralized with the tertiary monoamine to provide an internal quaternary ammonium salt and, hence, water dilutability.

Suitable carboxylic acids, and preferably the stearically hindered carboxylic acids, are well known and readily available. For example, they may be prepared from an aldehyde that contains at least 2 hydrogens in the alpha position which are reacted in the presence of a base with 2 equivalents of formaldehyde to form 2,2-hydroxymethyl aldehyde. The aldehyde is then oxidized to the acid by procedures known to those skilled in the art. Such acids are represented by the structural formula,

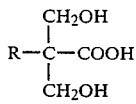

wherein R represents hydrogen, or alkyl of up to 20 carbon atoms, and preferably up to 8 carbon atoms. A preferred acid is 2,2-di(hydroxymethyl)propionic acid. The polymers with the pendant carboxyl groups are characterized as anionic polyurethane polymers.

The polyurethanes useful in the practice of the invention more particularly involve the reaction of di- or polyisocyanates and compounds with multiple reactive hydrogens suitable for the preparation of polyurethanes. Such disocyanates and reactive hydrogen compounds are more fully disclosed in U.S. Pat. Nos. 3,412,034 and 4,046,729. Further, the processes to prepare such polyurethanes are well recognized as exemplified by the aforementioned patents. In accordance with the present invention, aromatic, aliphatic and cyclo-aliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cyclo-aliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cyclo-aliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation, which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane impregnated sheet material. In addition, antioxidants may be added in art recognized levels to improve the characteristics of the final product. Typical antioxidants are the thioethers and phenolic antioxidants such as 4,4'-butylidine bis-meta-cresol and 2,6-ditert-butyl-para-cresol.

The isocyanate is reacted with the multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000, and in the context of the present invention, the most preferred is from about 400 to 7,000. Further, the polyether polyols improve flexibility proportionally with the increase in their molecular weight.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound HO(CH$_2$OC$_2$H$_4$O)$_n$H wherein n is an integer greater than 1, can also be used.

The polyol may also be a hydroxy terminated or hydroxy pendant polyester which can be used instead or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred when flexibility is desired. These glycols are reacted with aliphatic, cycloaliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthatlic, maleic, succinic, adipic, suberic, sebacic, terephthalic and hexahydrophthalic acids and the alkyl and halogen substituted derivatives of these acids. In addition, polycaprolactone terminated with hydroxyl groups may also be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions," incorporated herein by reference.

When used herein, "ionic dispersing agent" means an ionizable acid or base capable of forming a salt with the solubilizing agent. These "ionic dispersing agents" are amines, and preferably water soluble amines, such as triethylamine, tripropylamine, N-ethyl piperidine and the like; also, acid, and preferably, water soluble acids such as acetic, propionic, lactic and the like. Naturally, an acid or amine will be selected contingent on the solubilizing group pendant on the polymer chain.

The desired elastomeric behavior would generally require about 25 to 80 percent by weight of long chain polyol (i.e. 700 to 2,000 eq. wt.) in the polymer. The degree of elongation and elasticity may vary widely from product to product, depending upon the desired properties of the final product.

In forming the polyurethanes useful in the practice of the invention, the polyol and a molar excess of diisocyanate are reacted to form isocyanate-terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about 1 to 4 hours. To provide pendant carboxy groups, the isocyanate-terminated polymer is reacted with a molar deficiency of dihydroxy acid for 1 to 4 hours at 50° C. to 120° C. to form isocyanate-terminated prepolymer. The acid is desirably added as a solution, for example, N-methyl-1,2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendant carboxy groups are neutralized with an amine at about 58° C. to 75° C. for about 20 minutes, and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e. not capable of extensive further curing after formation except by the addition of an external curing agent.

Sufficient water is used to disperse the polyurethane at a concentration of about 10 to 40 percent by weight solids and a dispersion viscosity in the range of 10 to 1,000 centipoise. Viscosity may be adjusted in accordance with the particular properties desired and by the particular dispersion composition, which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

The characterization of the dispersions prepared in accordance with the invention is done by measurements of nonvolatile content, particle size, viscosity measurements and by stress/strain properties on strips of cast film.

It has been found that the anionic polyurethane dispersions form a coagulation matrix and while compatible polymer dispersions or emulsions may be mixed to form homogeneous stable aqueous compositions, the addition of anion to the composition will cause the entire polymer system to coagulate instantaneously, forming a coagulum of homogeneously admixed polyurethane polymer and the other polymer.

The polymer dispersions or emulsions useful in the practice of the invention are anionic, cationic or nonionic dispersions or emulsions of polymers which are water insoluble in their coagulated state and are compatible with the anionic polyurethane dispersion.

The polymers of such dispersions or emulsions can be elastomeric polymers such as neoprene or polyvinyl chloride, polyacrylate polymers, polyolefin polymers, polyfloroolefin polymers, phenolformaldehyde resin emulsions or the like.

It is to be recognized that according to the invention, substantial quantities of the polymer other than the polyurethane polymer are incorporated into the aqueous composition.

The neoprene latices useful in the practice of the invention are those which are nonionic, i.e. are emulsified with a nonionic emulsifier and have a pH of about 7. This is in contrast to the commercial anionic and cationic neoprenes which are not useful in the practice of the present invention. The anionically emulsified neoprene latices commercially supplied are incompatible with the aqueous anionic polyurethane dispersion so that when the two are mixed together they coagulate or precipitate, thus making them not useful as impregnation compositions.

On the other hand, the nonionic neoprene latices are compatible with the aqueous anionic polyurethane dispersions to form stable aqueous polymeric compositions. Moreover, surprisingly, these nonionic neoprene latices coagulate under ionic conditions only when combined with the polyurethane dispersion, thus providing a coagulant composed of neoprene polymer and polyurethane polymer. Surprisingly, substantially all of the nonionic neoprene coagulates, along with the anionic polyurethane dispersion.

Polyvinyl chloride resins which are formed through the polymerization of vinyl chloride and which may include vinylidene chloride to raise the glass transition temperature, may be incorporated as anionic particulate dispersions. The polyvinyl chloride dispersions are recognized as extremely stable due to their fine particle size, i.e. about $0.2\mu$ and do not coagulate when acidified to the level commonly used for the coagulation of polyurethane dispersions.

In addition to the polyvinyl chloride resin dispersions and neoprene latices, aqueous polymeric dispersions such as polyacrylates, phenol-formaldehyde resin emulsions, and polytetrafluoroethylene may be used, so long as the polymeric dispersions are compatible with the polyurethane dispersion to form a stable aqueous resin composition.

The phenol-formaldehyde resins useful in the practice of the invention are those derived from phenolic materials and formaldehyde or equivalents thereof, including resorcinol-formaldehyde and novolak resins. The phenolic resins useful in the practice of the invention are co-condensed with casein or its equivalents to aid in the emulsification of the finished resin in water. Typically, the phenol-formaldehyde resins are prepared by reacting the phenolic material with casein or its equivalent and only a portion of the formaldehyde or its equivalent at a level of about 25 percent. These phenol-formaldehyde resins are more fully disclosed in British Application Ser. No. 2,039,936 A entitled "Aqueous Polyurethane-Phenolic-Formaldehyde Resin Emulsions For Use as Adhesives, Primers and Surface Coatings" of Lord Corporation, published Aug. 20, 1980, incorporated herein by reference and made a part hereof.

Up to 65 percent by weight of the polymer other than the polyurethane polymer on a solids basis can be utilized in the composition while obtaining complete coagulation of the polyurethane and other polymer to form a homogeneous coagulant. Above 65 percent by weight of the polymer other than the polyurethane polymer, not all of that polymer coagulates and some remains in the aqueous phase.

At least 30 percent by weight of the polymer other than the polyurethane polymer on a solids basis is necessary to significantly modify the properties of the final product.

More particularly, the viscosity of the anionic polyurethane dispersion and aqueous polymeric dispersion or emulsion forming the stable aqueous composition should be at a level of about 10 to 5,000 centipoise to provide complete penetration of the aqueous system into the porous sheet material.

The polyurethane polymer and the other polymer should be impregnated into the porous sheet material, and particularly the fibrous batts at a level of at least 70 percent by weight add-on based upon the weight of the fibrous batt, and up to about 400 percent by weight. Preferably, the resin is impregnated at a level of about 200 to 300 percent by weight add-on based upon the weight of the porous sheet material. Coagulation is accomplished by contacting the impregnated substrate with an aqueous solution of an ionic media designed to ionically replace the solubilizing ion. In theory, although not intended to be bound by such theory, in the case of the anionically solubilized polymer, the amine which neutralizes the carboxyl-containing polyurethane is replaced with a hydrogen ion which reverts the anionic carboxyl ion, thus reverting the polymer to its original nondilutable condition. This causes coagulation of the polymer within the substrate. The stable aqueous polymeric composition can be coagulated with aqueous acidic acid solutions at concentrations of 0.5 percent to about 75 percent. Additionally, the stable aqueous polymeric composition can be coagulated by the addition of sodium or potassium silicofluoride, such as is described in U.S. Pat. No. 4,332,710, incorporated herein by reference.

In impregnating the batt with the stable aqueous polymer composition, the batt is immersed therein at a concentration level sufficient to provide an add-on of at least 70 percent by weight solids. Following initial immersion of the batt in the aqueous emulsion or dispersion, the batt may be squeezed to remove air and resaturated by a second immersion in the stable aqueous polymeric composition to provide full impregnation of the aqueous polymeric system within the batt. The batt, which is fully impregnated with the aqueous composition, is passed through wiping rolls or the like to remove excess dispersions and/or emulsion on the surface of the impregnated batt. The batt is then immersed in a bath containing the counterion, or heated if the aqueous polymeric composition contains a silicofluoride, to provide coagulation of the resin within the fibrous structure. It is to be noted that the coagulation is instantaneous and the coagulum is fixed within the batt. Upon drying, the polymer does not migrate. After coagulation, the batt may be squeezed to remove excess water and dried to form the impregnated web. The stable aqueous polymeric composition can also be used in the process described in U.S. Pat. No. 4,171,391 in respect of providing particular products.

When full impregnation is provided in accordance with U.S. Pat. No. 4,376,148, the batt is fully saturated, i.e. no retained air space, with the stable aqueous polymeric composition providing an ultimate add-on of at least 70 percent by weight of polymeric resin based on the weight of the batt. After drying, the batt has a novel structure wherein the batt has a uniform density throughout, and the bulk density of the web is less than the actual density of the web. Photomicrographs of this structure show both coated and uncoated filaments and concentrations of resin, along with voids. While the bulk density is substantially uniform throughout the thickness of the material, on a microscopic scale the structure is non-homogeneous.

A fully impregnated batt in accordance with the invention can be processed in accordance with U.S. Pat. No. 4,342,805.

Thus, the fully impregnated web or batt is placed in a press and heat and pressure are applied to both sides thereof. The heat and pressure are sufficient to fuse the polymer to itself within the impregnant at the surfaces of the material, but yet insufficient to completely fuse the polymer at the interior of the sheet material. The process develops a density gradient from the interior of the non-woven sheet material to the exterior surfaces. The gauge of the heated and pressed sheet material can be regulated by the pressure applied during the heating and pressing operation, or by the insertion of spacers between the press plates, or by use of a dead load press. In another process for forming simulated sheet material from the nonionic neoprene latex and aqueous polyurethane dispersion coagulated material within the fibrous batt, the impregnated batt can be placed in a press with only one of the plates heated to form the grain layer, while having the opposing side on the cool plate forming the split layer. The characterizing features of the simulated leather sheet material are primarily physical features wherein a density gradient is provided from one side of the sheet material to the opposing side of the sheet material. Preferably, the density gradient is uniform. One surface of the impregnated fibrous mass defines a grain layer, with this grain layer having an actual density equal to its bulk density.

"Bulk density," as used herein, means and refers to the density of the material including air space. "Actual density," as used herein, means and refers to the density of the material not including air space, i.e. specific gravity.

This grain layer closely simulates the grain layer of natural leather. On the opposing side of the sheet material there is a surface which defines the split layer which has a bulk density less than its actual density, with there being a preferably uniform density gradient throughout the material. The split layer is somewhat fibrous and simulates the split layer of natural leather.

EXAMPLE 1

To an appropriate vessel were charged 100 parts by weight on a solids basis of an aqueous anionic cross-linked polyurethane dispersion at a solids level of 25 percent. The polyurethane composition is that disclosed in Example 1 of U.S. Pat. No. 4,171,391. To the polyurethane dispersion were charged 100 parts by weight of fumed silica sold under the trade name Imsil 15, manufactured by Illinois Mineral Co., along with 100 parts by weight on a solids basis of neoprene latex sold by E. I. Du Pont de Nemours Company as Neoprene Latex 115, which is a copolymer of chloroprene and methacrylic acid with a polyvinyl alcohol dispersing agent. The pH of the neoprene was about 7, and the solids level was 47 percent by weight. The final pH of the neoprene latex, anionic polyurethane dispersion, silica blend was 7.5 to 8.0. To this admixture were charged 0.6 percent by weight sodium silicofluoride based on the weight of the admixture, and 0.3 percent borax as a buffer. After the impregnating composition was prepared, it was applied to a 24 ounce/yard$^2$ polyester fiber felt having 12 denier per filament. The felt was fully saturated with the stable aqueous polymeric composition by immersing the felt in the composition for 15 seconds. The felt had a weight add-on of 600 percent of the aqueous system. Coagulation was accomplished by plunging the fully saturated batt into the water bath at 200° F., and provided complete coagulation of the neoprene and the polyurethane within the batt. The immersion water was clear, thereby indicating that substantially, if not all, of the resin remained coagulated within the batt. The impregnated batt was dried by a radiant heater and had an add-on of 125 percent by weight of neoprene, polyurethane and silica, and a thickness of 250 mils with a bulk density of 0.5 g/cc. The dried composite was compressed at 275° F. under pressure to a density of 1.2. The final simulated sheet material had a soft pliable structure suitable for conveyor belts, waist belts and similar leather uses.

EXAMPLE 2

Example 1 was repeated, except that the polyurethane dispersion used was that described in U.S. Pat. No. 4,171,391 in Example 2, and required 1.0 percent sodium silicofluoride and 1.2 percent borax. After treating under heat and pressure, the product had a firm texture, suitable of conveyor belting and waist belting.

EXAMPLE 3

To an appropriate vessel were charged 100 parts by weight of a vinyl chloride/vinylidene chloride copolymer aqueous anionic dispersion and 100 parts by weight of a polyurethane aqueous anionic dispersion. The vinyl chloride copolymer was sold under the trade name Geon 460X9 by B. F. Goodrich Company and had a $T_g$ of 50° C. and was at 46 percent solids. The polyurethane dispersion was at 32 percent solids and was prepared in accordance with Example 1 of U.S. Pat. No. 4,171,391. The total solids of the final admixture was 38 percent in water. The admixture formed a stable aqueous composition. 1.8 percent by weight based on the weight of the admixture were charged to the admixture with agitation. The aqueous composition was used to impregnate a 100 percent polyester felt of 10 denier/filament fibers and having a weight of 24 ounce/yard$^2$. The felt was saturated by dipping in the aqueous composition for 15 seconds to achieve full impregnation. The wet add-on to the felt was 600 percent. The aqueous composition was coagulated by plunging the impregnant into a water bath at 200° F. Coagulation was instantaneous upon heat transfer. The coagulation water was clear, indicating that the coagulation was complete and all of the vinyl chloride polymer remained in the coagulum. The impregnated batt was dried by a radiant heater and had a dry add-on of 220 percent polymer. The dried composite was 250 mils thick with a density of 0.6 g/cm$^3$. The composite was boardy. The composite was pressed to a density of 1.2 at 275° F.; the hot pressed composite was extremely flexible and could be formed into contours. Upon cooling to room temperature, the composite became rigid with a glossy surface. The composition can be placed in a mold, heated and formed to provide automotive parts, safety sports equipment and the like.

EXAMPLE 4

A homogeneous admixture of 46 percent total solids was made by mixing 40 parts by weight of 60 percent solids polytetrafluoroethylene latex with 35 parts by weight of a 30 percent solids polyurethane dispersion. The polytetrafluoroethylene aqueous latex was stabilized with a nonionic surfactant sold under the trade name Teflon 30 by E. I. Du Pont de Nemours Company. The polyurethane dispersion was in accordance with Example 1 herein. One percent by weight of sodium silicofluoride based on the weight of the homogeneous admixture was charged thereto. Upon heating to about 130° F., the admixture coagulated with substantially complete coagulation of the polymers therein, forming a rigid gel.

The leather-like sheet materials produced in accordance with the invention, along with the impregnated products, differ from those impregnated only with polyurethane dispersion in that they can be engineered to have higher tear strengths or greater or lesser pliability, and can be made to be capable of being embossed to form aesthetically pleasing surfaces at lower temperatures than the polyurethane dispersions, while maintaining their physical properties. Thus, a broader range of products can be provided in accordance with the invention.

Although the invention has been described with reference to particular materials and particular processes, it is only to be limited so far as is set forth in the accompanying claims.

I claim:

1. A method of forming a composite sheet material comprising:

impregnating a fibrous web with an aqueous ionic dispersion of a polyurethane polymer, and a compatible anionic, cationic or nonionic dispersion or emulsion of a polymer selected from the group consisting of neoprene, polyvinyl chloride, polyacrylate polymers, polyolefin polymers and polyfloroolefin polymers wherein the polymer is water insoluble in its coagulated state;

ionically coagulating said polyurethane and compatible dispersion or emulsion to form an impregnant wherein said polymer other than the polyurethane polymer is present at a level of 30 to 65 percent by weight based on the total weight of polymer; and drying said impregnant to form a composite sheet material having a uniform density throughout.

2. The method of claim 1 wherein said fibrous web is a needled fibrous batt.

3. The method of claim 2 wherein said needled fibrous batt has a bulk density of less than 0.5 g/cm$^3$.

4. The method of claim 3 wherein said needled fibrous batt has a bulk density of less than 0.25 g/cm$^3$.

5. The method of claim 3 wherein said needled fibrous batt has a bulk density of between about 0.12 and 0.4 g/cm$^3$.

6. The method of claim 1 wherein the compatible polymeric dispersion or emulsion is a neoprene latex.

7. The method of claim 1 wherein said fibrous web is fully impregnated when coagulated.

8. The method of claim 2 wherein said needled fibrous batt has a thickness of at least 30 mils.

9. The method of claim 2 wherein said needled fibrous batt is composed of substantially non-fusible fibers.

10. The method of claim 1 wherein the combined solids of said aqueous anionic polyurethane dispersion and the compatible polymeric dispersion or emulsion is about 5 to 60 percent by weight.

11. The method of claim 1 wherein said polyurethane is crosslinked.

12. The method of claim 1 wherein the polyurethane polymer and the other polymer are present in said web at a level of at least 70 percent by weight add-on based upon the weight of the fibrous batt.

13. The method of claim 12 wherein said polyurethane polymer and the other polymer are present at a level of less than about 400 percent by weight add-on based upon the weight of said fibers.

14. The method of claim 13 wherein said polyurethane polymer and the other polymer are present at a level of about 200 to 300 percent by weight add-on based upon the weight of said fibrous batt.

15. The method of claim 1 wherein said impregnated fibrous web has a density of up to about 0.75 g/cc.

16. The method of claim 15 wherein said impregnated fibrous web has a density of between about 0.4 about 0.75 g/cc.

17. An impregnated fibrous web comprised of a fibrous web having impregnated therein a coagulated homogeneous admixture of anionic dispersion of a polyurethane polymer and a compatible anionic, cationic or nonionic dispersion or emulsion of a polymer selected from the group consisting of neoprene, polyvinyl chloride, polyacrylate polymers, polyolefin polymers and polyfloroolefin polymers wherein said polymers are water soluble in their coagulated state; said coagulated polymers are present at a level of 30 to 65 percent by weight based on the total weight of polymer in the impregnated fibrous web and said impregnated fibrous web having a uniform density throughout.

18. The sheet material of claim 17 wherein the polymer other than the polyurethane polymer is neoprene.

19. The impregnated porous sheet material of claim 17 wherein said porous substrate is a needled fibrous batt.

20. The impregnated porous sheet material of claim 19 wherein:

the homogeneous admixture of coagulated polyurethane anionic dispersion and a compatible polymeric dispersion or emulsion is distributed throughout the batt with the density of said impregnated porous sheet material uniform throughout;

the bulk density of said sheet material being less than the actual density of said sheet material, whereby the sheet material is porous; and said impregnated web having filaments which are both coated and uncoated with polymeric resin, and concentrations of polymeric resin.

21. The impregnated porous sheet material of claim 20 wherein said polyurethane and other polymer are present at a level of at least 70 percent by weight add-on based upon the weight of the fibrous batt.

22. The impregnated porous sheet material of claim 21 wherein said polyurethane and other polymer are present at a level of less than 400 percent by weight add-on based upon the weight of the fibrous batt.

23. A simulated leather sheet material comprising a polymer impregnated fibrous mass with a grain layer forming one surface, the grain layer having an actual density equal to its bulk density and a split layer forming the opposing surface, the improvement comprising said polymer being comprised of a homogeneous admixture of a coagulated anionic polyurethane dispersion and a coagulated anionic, cationic or nonionic dispersion or emulsion of a polymer selected from the group consisting of neoprene, polyvinyl chloride, polyacrylate polymers, phenol-formaldehyde resins, polyolefin polymers and polyfloroolefin polymers wherein the polymer is water insoluble in its coagulated state; and wherein the polymer other than the polyurethane polymer is present at a level of 30 to 65 percent by weight based on the total weight of polymer in the simulated leather sheet material.

24. The simulated leather sheet material of claim 23 wherein the other polymer is neoprene.

* * * * *

UNITED STATES PATENT AND TRADEMARK OFFICE
CERTIFICATE OF CORRECTION

PATENT NO. : 4,496,624

DATED : January 29, 1985

INVENTOR(S) : John R. McCartney

It is certified that error appears in the above-identified patent and that said Letters Patent is hereby corrected as shown below:

Column 3 Line 61 "disocyanates" should read --diisocyanates--.

Column 5 Line 12 "phthatlic" should read --phthalic--.

Column 5 Line 50 "carboxy" should read --carboxyl--.

Column 5 Line 60 "carboxy" should read --carboxyl--.

Column 7 Line 31 "936" should read --926--.

Claim 16 - Column 12 Line 2 After "0.4" insert --to--.

Signed and Sealed this

Thirtieth Day of July 1985

[SEAL]

Attest:

DONALD J. QUIGG

Attesting Officer   Acting Commissioner of Patents and Trademarks